UNITED STATES PATENT OFFICE 2,394,092

β-PHENYL, β-ALKYL ISOPROPYL AMINES

Fred P. Nabenhauer, Somerton, Pa., assignor to Smith, Kline & French Laboratories, Philadelphia, Pa., a corporation of Pennsylvania No Drawing. Application June 7, 1938,
Serial No. 212,391

6 Claims. (Cl. 260—570.8)

This invention relates to a new composition of matter and more particularly to a new composition of matter which has been found to have, among other uses, desirable therapeutic characteristics rendering it advantageous for use variously as a chemical intermediate, as a medicinal preparation for the treatment of various conditions of the human and animal system, etc.

The new composition, among other uses, will be useful, for example, as an intermediate for the preparation of various chemical compounds such, for example, as isoquinoline compounds.

More particularly, from the therapeutic standpoint the new composition in accordance with this invention in various forms will be found to be advantageous; for producing effects simulating stimulation of the sympathetic nervous system and for effecting contraction or relaxation of smooth muscle depending upon the function of the sympathetic nervous system; for effecting vasoconstriction, and for producing general and local effects resultant therefrom, respectively. In general, the effects produced adapt it for the treatment of any condition where general or local effects resultant from affecting the sympathetic nervous system, are therapeutically effective and desirable.

From the broad standpoint the composition contemplated by this invention will comprise certain primary and secondary alkyl amines derived from certain benzyl alkyl carbinamines, generally speaking, by the substitution of a methyl group on the β-carbon of the side chain; and the organic and inorganic salts thereof. Variously the new composition contemplated here from the broad standpoint will be made apparent from the following structural formula:

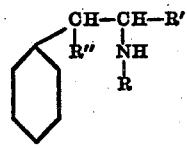

where R" and R', respectively are either a methyl, ethyl, propyl or isopropyl group, and R is hydrogen or a methyl group; and organic and inorganic salts of said compounds.

From the therapeutic standpoint the bases comprising the primary and secondary amines disclosed above will have advantages as indicated, as will also the non-toxic organic and inorganic salts thereof, produced with organic and inorganic acids yielding non-toxic ions, as for example, the hydrochlorides, sulphates, oleates, tartrates, etc.

From the more specific standpoint generally and from the therapeutic standpoint broadly, this invention will be made apparent by the following structural formula:

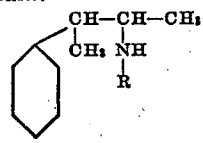

where R is hydrogen or a methyl group; and non-toxic organic and inorganic salts of said compounds.

From the therapeutic standpoint the primary and secondary amines will be advantageously used in admixture with an extender or excipient, or in solution in a light mineral oil to a concentration of, for example, 0.25–5.0%. The non-toxic salts will lend themselves to extension in water, as in aqueous solution. The bases may be locally applied, for example, to the mucosa, in vapor form by inhalation extended with air.

The new composition of matter in accordance with this invention from the broad and specific standpoints may be prepared in any desired manner, no claim to any particular method of preparation being made. The method of preparation will be made obvious by the following illustration for the preparation of specific primary and secondary amines and salts thereof.

By way of general illustration, the composition in accordance with this invention from the broad and specific standpoints may be effectively prepared by treating a ketone of the following structure:

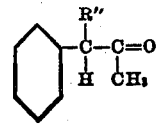

wherein R" is an alkyl group, as methyl (CH₃), ethyl (C₂H₅), propyl (C₃H₇), etc., with formamide, or for the production of N-methyl derivatives with N-methyl formamide, thereby obtaining the corresponding formyl derivative, hydrolyzing to the amine salt and liberating the salt from its solution with alkali.

Where a salt of the base, or of the N-methyl derivative thereof is to be prepared, such may be readily accomplished by neutralizing the base with a suitable acid, as hydrochloric, oleic, tartaric, sulphuric, etc.

By way of more specific illustration, for example, β-phenyl, β-methyl isopropyl amine may be prepared from phenyl methyl acetone by adding to 1 mole of phenyl methyl acetone 5 moles of formamide at a temperature of about 150–170° C. The reaction, which will result in the production of the formyl derivative, will proceed as follows:

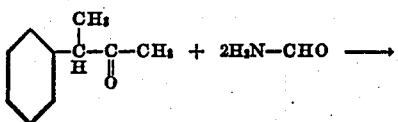

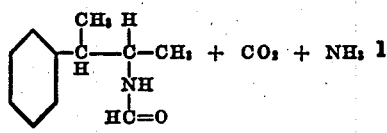

The formyl derivative will be hydrolyzed in any well known manner, such as with constant boiling hydrochloric acid and water to produce the amine salt which will have the following formula:

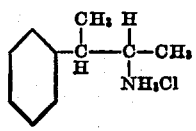

The amine salt will then be liberated from its solution by treatment with an excess of alkali, as, for example, sodium hydroxide, with the production of β-phenyl, β-methyl isopropyl amine:

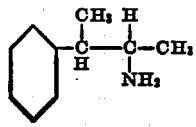

The base when separated and dried boils at 216° C.

For the preparation of the N-methyl derivative of, for example, β-phenyl, β-methyl isopropyl amine, the above procedure will be followed, except that N-methyl formamide will be used in place of formamide. The N-methyl derivative so prepared boils within the range 214–220° C.

The salts of the base, as hydrochlorides, sulphates, etc. and of the N-methyl derivatives thereof may be readily prepared by neutralizing with a suitable acid, as hydrochloric, oleic, tartaric, sulphuric, etc.

In using the broad and specific embodiments of this invention for therapeutic effect, generally speaking the bases will be used locally, while the salts, which may also be used locally, will be preferable for oral or parenteral administration. The compounds may be conveniently extended for use, either by admixture with an excipient, as lactose or other suitable excipient, or a solvent, as water, in the case of the salts, or an oil, as a mineral or vegetable oil in the case of the bases. Thus, for example, the β-phenyl, β-alkyl isopropyl amines and the N-methyl derivatives thereof may be dissolved, for example, in an oil, as a vegetable or mineral oil, and applied for local vasoconstriction, as for shrinking the nasal mucosa, in the form of a spray. Again, since the bases are volatile at ordinary room temperature, they may be suitable supported in an inhaler and applied for shrinking the nasal mucosa by inhalation. The salts of the β-phenyl, β-alkyl isopropyl amines and of the N-methyl derivatives may be applied in aqueous solution for producing mydriasis or, as a spray, for shrinking the nasal mucosa. Again, for producing relaxation or contraction of smooth muscle, or general systemic vasoconstriction, aqueous solutions of the salts of the β-phenyl, β-alkyl isopropyl amines or of the N-methyl derivatives thereof, may be parenterally administered and such may be orally administered, or if desired, the compounds may be administered in tablet form in admixture with any suitable excipient, as for example, lactose, sucrose, starch, etc., together with a binder, as for example, gelatin.

In use of the new composition in accordance with this invention for medicinal function or therapeutic effect the dosage or amount administered will depend upon a number of factors. Thus, particular dosage will depend upon the condition of the patient to be relieved, the quantitative or qualitative effect to be produced, the specific composition selected for administration, the mode of administration and the patient's individual reaction to the particular composition and mode of administration.

This application is a continuation in part of an application filed by me, Serial No. 143,939, filed May 21, 1937, and an application filed by me, Serial No. 92,847, filed July 27, 1936.

What I claim and desire to protect by Letters Patent is:

1. A medicinal remedy for application to the nasal mucosa to produce shrinkage thereof without producing affect upon the central nervous system, comprising essentially a compound from the group consisting of compounds having the following formula:

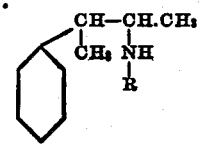

where R is a member of the group consisting of hydrogen and a methyl group and non-toxic salts of said compounds.

2. A medicinal remedy for application to the nasal mucosa to produce shrinkage thereof without producing affect upon the central nervous system, comprising essentially a compound from the group consisting of compounds having the following formula:

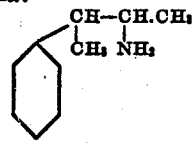

and non-toxic salts thereof.

3. A medicinal remedy for application to the nasal mucosa to produce shrinkage thereof without producing affect upon the central nervous system, comprising essentially a compound from the group consisting of compounds having the following formula:

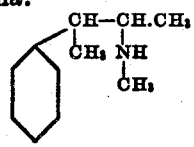

and non-toxic salts thereof.

4. A compound from the group consisting of compounds having the formula:

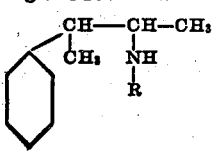

where R is a member of the group consisting of hydrogen and a methyl group; and salts of said compounds.
5. The compound having the formula:
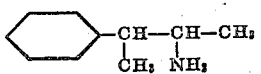
6. The compound having the formula:
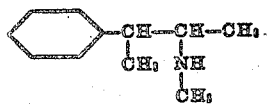
FRED P. NABENHAUER.